(12) United States Patent
Palvölgyi

(10) Patent No.: US 6,253,788 B1
(45) Date of Patent: Jul. 3, 2001

(54) CHECK VALVE FOR USE IN A FILLER PIPE FOR FILLING A FUEL TANK

(75) Inventor: Sandor Palvölgyi, Gleisdorf (AU)

(73) Assignee: Tesma-Motoren-und Getriebetechnik Ges. m.b.H., Preding (AT)

( * ) Notice: Subject to any disclaimer, the term of this patent is extended or adjusted under 35 U.S.C. 154(b) by 0 days.

(21) Appl. No.: 09/533,139

(22) Filed: Mar. 23, 2000

(30) Foreign Application Priority Data

Mar. 29, 1999 (GM) ..................................... 213-99

(51) Int. Cl.[7] ................................................. F16K 15/00
(52) U.S. Cl. .................... 137/512.1; 137/521; 137/592
(58) Field of Search ................. 137/512.1, 592, 137/521

(56) References Cited

U.S. PATENT DOCUMENTS

| | | |
|---|---|---|
| 2,292,003 | 8/1942 | Yant et al. . |
| 3,312,237 | 4/1967 | Mon et al. . |
| 4,230,148 * | 10/1980 | Ogle, Jr. ............................ 137/512.1 |
| 4,774,981 * | 10/1988 | Mizusawa ......................... 137/512.1 |
| 4,896,695 * | 1/1990 | Pysh .................................. 137/512.1 |
| 5,245,956 | 9/1993 | Martin . |
| 5,381,821 * | 1/1995 | Muddiman ........................ 137/454.2 |
| 5,518,026 | 5/1996 | Benjey . |
| 6,098,656 * | 8/2000 | Farina ............................... 137/512.1 |

FOREIGN PATENT DOCUMENTS 794511    5/1958   (GB) .

* cited by examiner

Primary Examiner—A. Michael Chambers
Assistant Examiner—Thomas L. McShane
(74) Attorney, Agent, or Firm—Bachman & Lapointe, P.C.

(57) ABSTRACT

A check valve for use in a filler pipe of a motor-vehicle fuel system, having a housing fixed in the interior of the pipe and a movably mounted flap closure which is opened by the flow of fuel through the filler pipe to the fuel tank, and closes again automatically when fueling stops. According to the invention, a configuration that is particularly favorable in terms of flow dynamics is provided wherein the flap closure comprises two valve flaps which are movably mounted jointly in the region of the center of the housing.

36 Claims, 8 Drawing Sheets

CHECK VALVE FOR USE IN A FILLER PIPE FOR FILLING A FUEL TANK

BACKGROUND OF THE INVENTION

The present invention concerns a check valve for a filler pipe for the filling of a motor-vehicle fuel tank, having a housing fixed in the interior of the pipe and a movably mounted flap closure which is opened by the inflowing fuel and closes again automatically.

Various types of check valves can be fitted in filler pipes for the filling of a motor-vehicle fuel tank. A check valve is intended to prevent the fuel from rising back up into the filler pipe and escaping from the filling opening, as a result of the positive pressure occurring in the tank during filling, when the filling nozzle is switched off. The check valves do not have to provide a completely tight seal, but must oppose the return flow with adequate resistance, with the result that there is no undesired and troublesome escape of fuel from the filler pipe after filling.

Most of the check valves known for this purpose have spherical or conical valve bodies which, under the force of a weak spring, are directed against the filling flow and are opened by the inflowing fuel. The valves automatically close the opening when the inflowing fuel breaks off. There are configurations which are provided with elastomeric seals and also configurations which provide a seal only by resting on the valve seat. All of these known valves have the disadvantage that the fuel flow undergoes a sharp diversion. In the case of many configurations, it is only possible for the valves to be fitted at the end of the filler pipe or in a corresponding widening of the pipe, since the deflected fuel flow takes up space laterally. The fuel is subjected to great turbulence by the deflection, which leads to outgassing and hinders filling of the tank. The increased amount of gas must also be passed either into the ambient air or into active carbon filters, as are required for example in the USA, which entails further disadvantages.

Check valves of the type mentioned at the beginning which have a valve flap swivel-mounted laterally on the housing and held in the closed position either by its own weight or else under the force of a spring are also known. It is also the case with these valves that the opening and closing is brought about by the flow of fuel, as described above. In the case of these valves, the valve flaps have a much smaller diameter than corresponds to the inside diameter of the pipe, in order to be able to swing open. The mounting of the valve flap and the internal valve seating considerably reduce the cross-sectional area through which flow can pass, however, and the opened flap also causes great turbulence, which has the consequence of the outgassing described above.

It is a principal object of the present invention to design a check valve of the type described above wherein significantly less turbulence and disturbance of the flow of the fuel occurs during filling than is the case with known valve configurations, and consequently no or only insignificant outgassing takes place.

SUMMARY OF THE INVENTION

The foregoing object is achieved according to the present invention wherein the flap closure comprising two valve flaps which are movably mounted jointly in the region of the center of the housing in a removable manner.

Check valves configured according to the invention therefore have two valve flaps for an opening and closing movement which are mounted in the region of the center of the filler pipe. In their open position, the valve flaps can consequently assume an attitude which is very favorable in terms of flow dynamics. The fuel is therefore scarcely deflected and no significant turbulence occurs. Check valves designed according to the invention can also be fitted into filler pipes configured without widenings (as described above) and at the same time retain their advantages.

The movable mounting of the valve flaps on the housing is of a particularly simple form if there is provided centrally on the housing a bearing part which passes transversely through said housing and is at least essentially closed at its region facing the filling opening of the filler pipe. It is of advantage here if this region is configured with a contour that is favorable in terms of flow dynamics.

According to a preferred embodiment of the invention, the valve flaps are produced from a material which largely supports their mobility for assuming an open position or a closed position. This opens up a number of possibilities for the configuration and arrangement of the valve flaps.

Precisely in the case of such an embodiment it is possible to design the valve flaps as component parts of a double flap of an integral configuration.

In this case, the valve flaps may consist of a flexible material, in particular of a flexible film. Precisely such a material offers very little opening resistance.

In the case of this first embodiment, the flexible valve flaps can be clipped into snap-in recesses or the like of the bearing part by means of a holder, which is provided with snap-in elements guided through the valve flaps.

In the case of a second possible embodiment, where the material brings about the required mobility for assuming the open position and for returning into the closed position, the valve flaps are produced from spring steel sheet or a comparable material.

The arrangement or mounting of the valve flaps can be carried out on the bearing part of the housing in a space-saving and simple way. For this purpose, the valve flaps can, for example, be arranged on the bearing part by means of foot parts or by means of one foot part connecting them, the foot part or parts being held on the housing by a cross bar.

In the case of a third embodiment, where particularly little space is available for the mounting of the valve flaps, the valve flaps are swivel-mounted on the bearing part.

A particularly simple configuration of a swivel mounting provides that the valve flaps are mounted on the bearing parts in the manner of a hinge. This also promotes a design of the bearing part that is favorable in terms of flow dynamics. In the case of this embodiment of the invention, the valve flaps may be molded parts, in particular molded plastic parts.

In the case of this embodiment, it may be advantageous to provide a spring acting on the valve flaps to support a movement of the valve flaps into the closed position.

In the case of a preferred configurational variant of the invention, the extent of the movement of the valve flaps required for opening or closing is kept small, in that the valve seats for the valve flaps are formed by a V-shaped incision in the housing, the tip of which points toward the filling opening. This design is of advantage in particular in the case of those embodiments where the valve flaps are movable as a consequence of their material properties and their mounting. In this case, an angle between the two valve seats of the order of magnitude of 90° is also particularly favorable.

BRIEF DESCRIPTION OF THE DRAWINGS

Further features, advantages and details of the invention are now described more precisely with reference to the drawing, which represents several exemplary embodiments.

DETAILED DESCRIPTION

Figure 1:
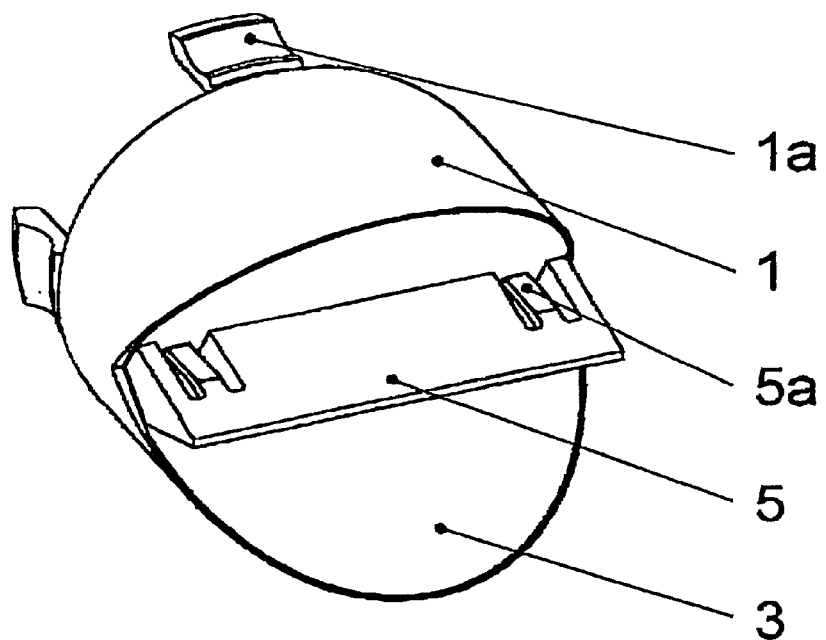
FIG. 1 shows an oblique view of the check valve of a first embodiment of the invention in the closed position.
Figure 2:
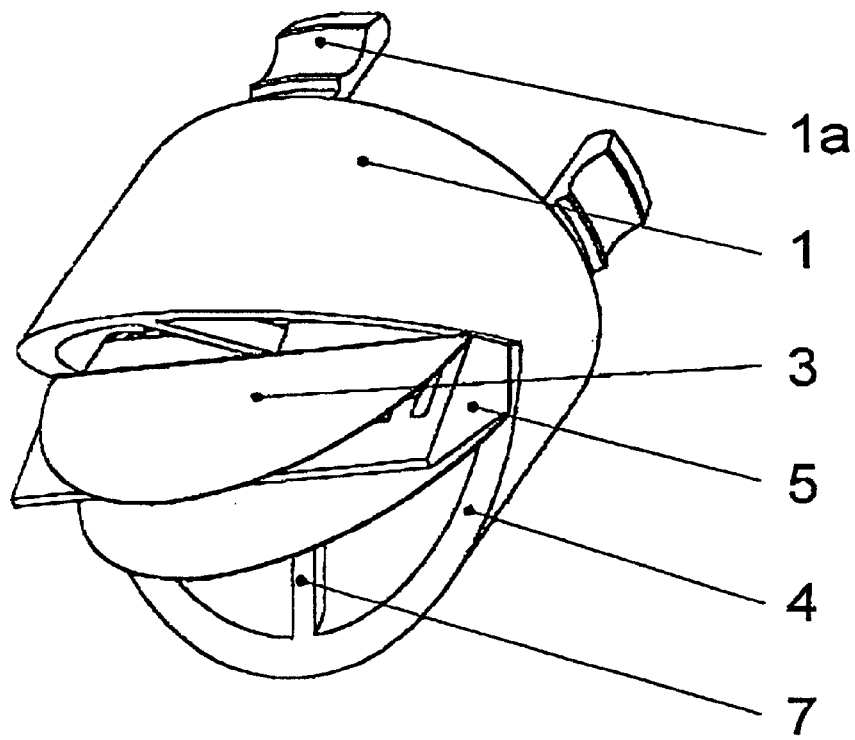
FIG. 2 shows an oblique view of the valve of FIG. 1 in its opened position.

Check valves configured according to the present invention are intended for fitting in the interior of a filler pipe for the filling of a fuel tank with fuel. Check valves configured according to the invention, and consequently also the embodiments represented, all have a housing which is adapted to the form and inside diameter of the filler pipe and consequently are in particular and essentially shaped cylindrically.

In the case of the embodiments represented in FIGS. 1 through 15, the housing 1, 1', 1", 1'" is provided at its end region, facing the filling opening, with a number of snap parts 1a, 1'a, 1"a, 1'"a which are distributed over the circumference and are located on an elevation 2a, 2'a, 2"a running around the inside of the filler pipe 2, 2', 2", whereby the housing 1, 1', 1" is fixed in its position in the filler pipe 2, 2', 2". This type of fastening of the valve is carried out in the case of all the exemplary embodiments represented, so it is not discussed any further in the following more detailed description of the individual embodiments.

In the case of all the configurational variants represented, two valve seats 4, 4', 4", 4'" are made available for two valve flaps 3, 3', 3", 3'" by a wedge-shaped or V-shaped incision in the otherwise cylindrical housing body. The valve seats 4, 4', 4", 4'" form in cross section a V which is symmetrically shaped with respect to the center plane of the housing 1, 1', 1", 1'" and the tip of which points toward the filling opening, not represented in the drawing figures. It is designed here in such a way that the two valve seats 4, 4', 4", 4'" and consequently also the valve flaps 3, 3', 3", 3'" form an angle of approximately 90° with respect to one another when the valve is closed. This angle may, however, also be chosen to be larger or smaller. This design also is no longer repeated in the description of the individual configurational variants.

The first exemplary embodiment is now described with reference to FIGS. 1 to 6. As can be seen in particular from FIG. 3, the two valve flaps 3 are the component parts of a double flap of an integral configuration, which in the case of this embodiment consists of a flexible material, in particular of a flexible film, for example of a suitable plastic. The two valve flaps 3 are produced by a central folding of a film part, corresponding from its surface area to the two openings to be closed. Provided for the fastening of the valve flaps 3 to the housing 1 is a holder 5, which is shaped here in deltoid form in cross section and, from its length, corresponds to the length of the fold between the two valve flaps 3. The surface areas present along the two shorter sides of the deltoid form of the holder 3 form with one another an angle which corresponds to that angle which the two wedge-shaped valve seats 4 form with one another. Formed on each side region of the holder 5, at the top and bottom, there is a recess, where there is respectively formed, in a slightly resilient way with respect to the holder 5, a snap-in element 5a with an outwardly pointing snap-in lug 5b. The snap-in elements 5a protrude beyond the holder 5 to the extent that they can be guided through openings 3a in the region of the folding of the double flap and subsequently snap-fitted onto the housing 1.

Provided for this purpose in the center of the housing 1 is a bearing part 6, which extends over the entire width of the housing 1 and in that region where the two valve seats 4 come together. The bearing part 6 is open on one side and closed on the other side and is of a rounded-off configuration. The closed side is aligned such that it faces the filling opening. The bearing part 6 is, furthermore, provided with recesses 6a having snap-in steps 6b (see FIG. 6), where the snap-in lugs 5b of the snap-in elements 5a are located when the holder 5 is snap-fitted in. The design in this respect can be seen in particular from FIG. 6, where a cross section through the valve in the region of one of the pairs of snap-in elements 5a is represented.

Figure 4:
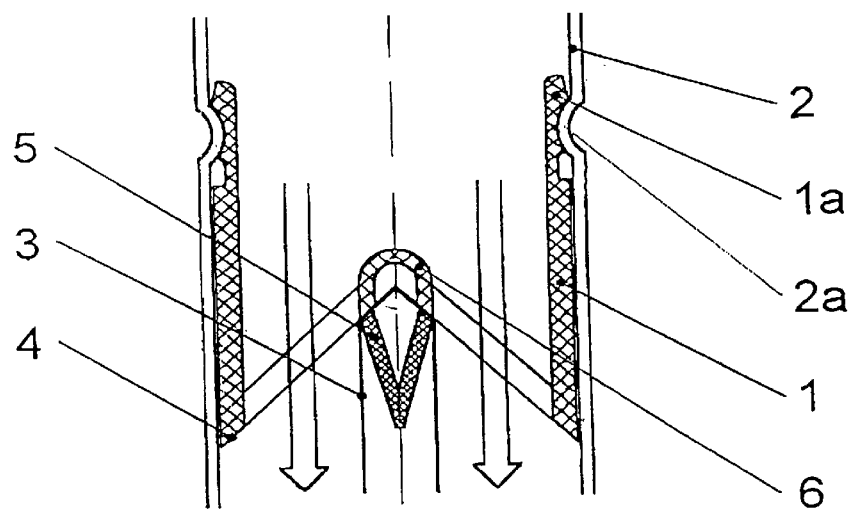
FIG. 4 shows a central cross section through the opened valve according to FIG. 2.
Figure 5:
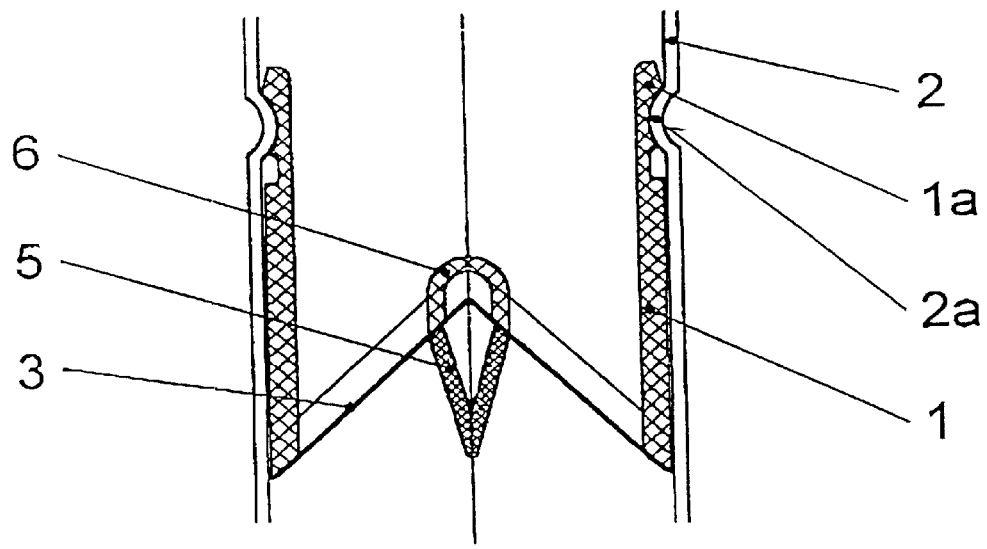
FIG. 5 shows a central cross section through the closed valve according to FIG. 3.
Figure 6:
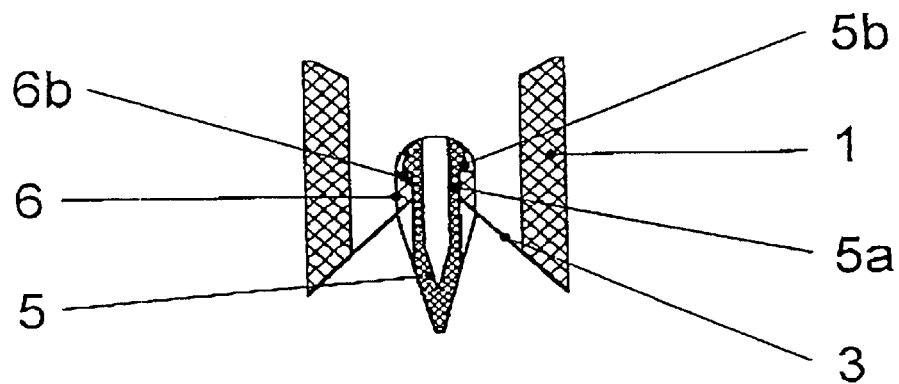
FIG. 6 shows a section parallel to the sectional plane according to FIG. 5, but through two snap-in elements of the flap securing elements.

As can be seen in particular from FIG. 4 and FIG. 5, the provision of corresponding bevels on the bearing part 6 insures that all the components, in particular the holder 5, the valve flaps 3 and the bearing part 6, are joined together in the check valve in a way such that they are adapted to one another.

As revealed by FIG. 1 in conjunction with FIG. 5, the two valve flaps 3 close the valve openings when the valve is unactuated. In this position, the check valve consequently effectively prevents undesired rising back and escape of fuel from the filling opening after the filling of the fuel tank.

Figure 3:
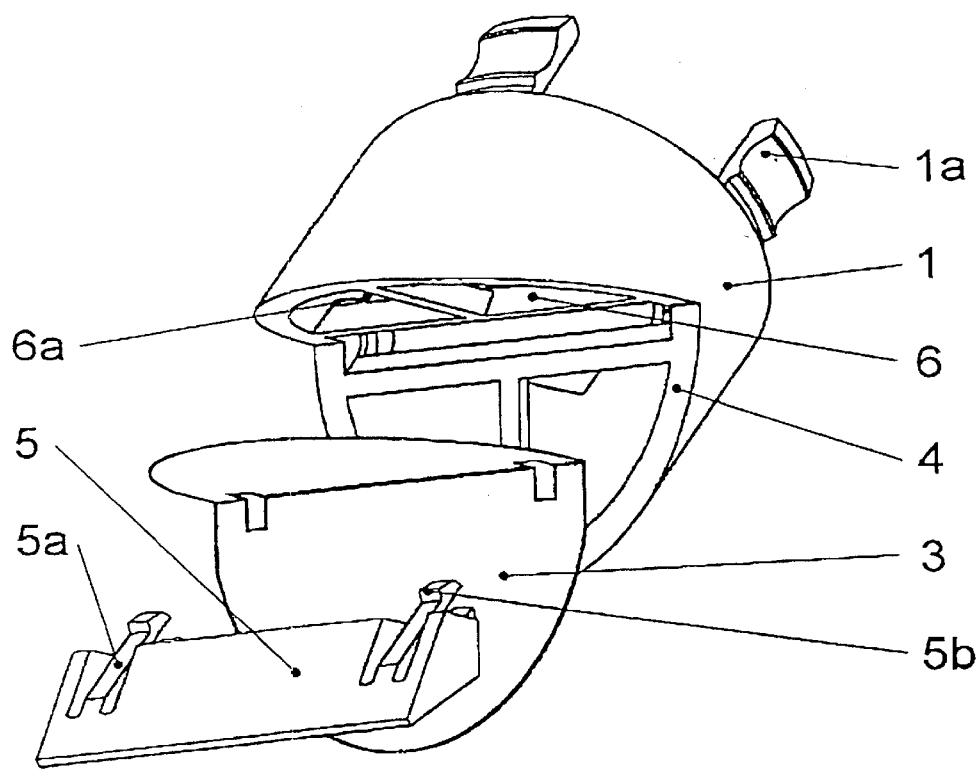
FIG. 3 shows an oblique view of the essential details of the elements of the valve of FIG. 1.

In order to prevent unintentional folding of the flexible flaps 3 backward into the housing 1 in any event, ribs 7, which correspondingly support the film or the valve flaps 3, are provided, as FIG. 3 shows in particular. In the case of the exemplary embodiment represented, a relatively thin rib 7, which extends centrally between the bearing part 6 and in each case one of the edge regions forming the valve seats 4, is respectively provided for each opening.

During filling with fuel by means of a filling nozzle, the valve flaps 3 are opened by the fuel flow and, as a consequence of the flexibility of the flap material, assume the position shown in FIG. 4, where the two arrows symbolize the filling-in direction of the fuel. As can be seen from this drawing figure, the fuel flowing through is scarcely opposed with any resistance by the check valve, since the fuel is deflected only insignificantly. Contributing in particular to this is the central position of the two valve flaps 3 and also the design of the region of the bearing part 6 facing the fuel flow.

Figure 7:
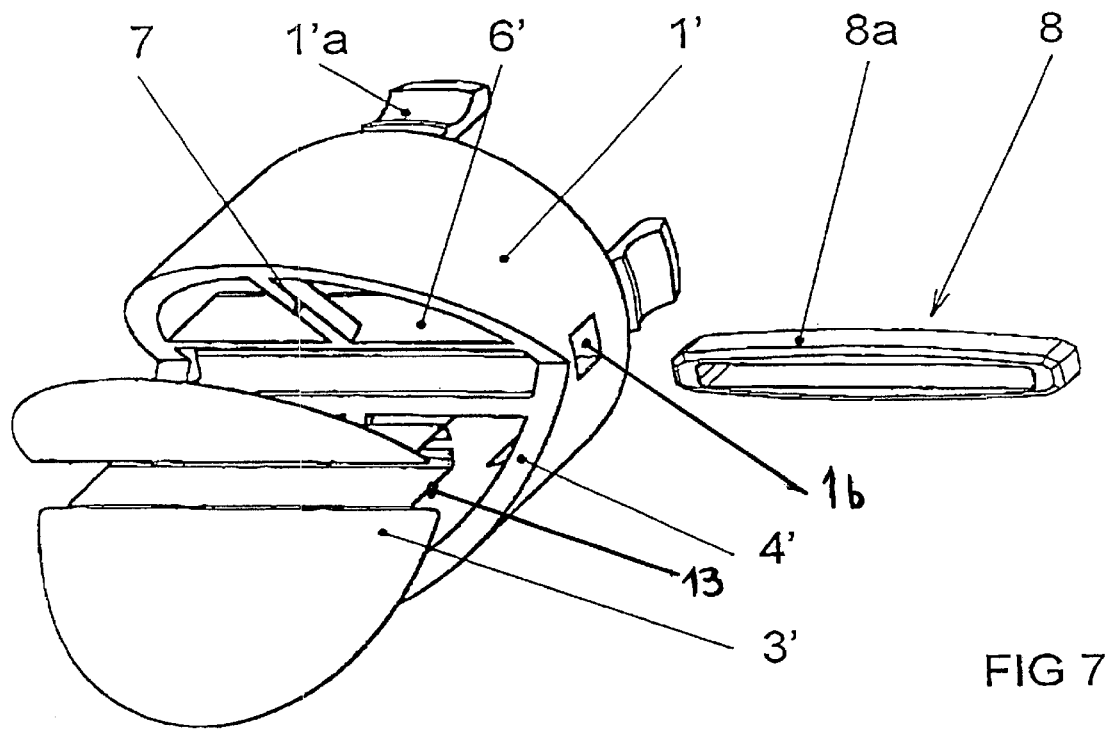
FIG. 7 showing the individual components in an oblique view of a second embodiment of valve according to the present invention.
Figure 8:
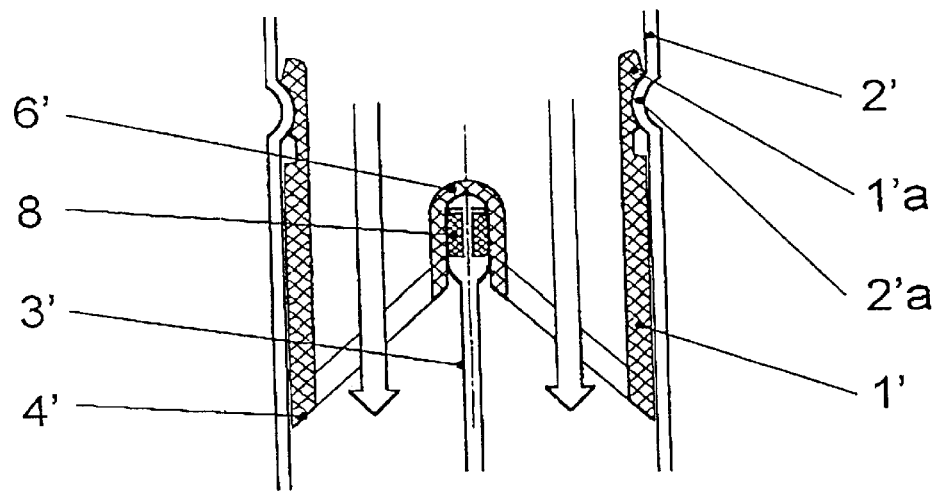
FIG. 8 is a central cross section through the valve of FIG. 7 in the opened position.
Figure 9:
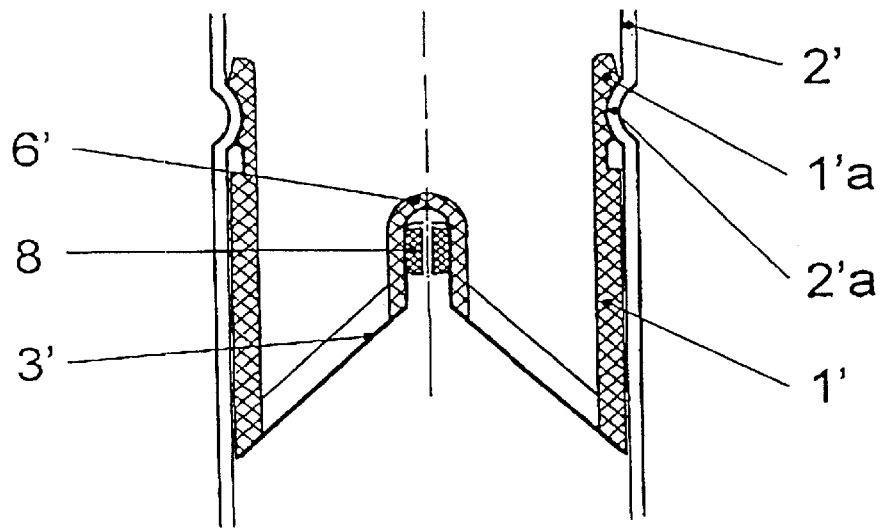
FIG. 9 is a central section through the valve in FIG. 7 in the closed position.

In the case of the second embodiment of a check valve, represented in FIGS. 7 to 9, the valve flaps 3' are produced from a thin spring steel sheet. This offers the advantage that the closing of the valve is supported by the restoring force of the material used, spring steel. The magnitude of the restoring force can be determined by the choice of sheet thickness.

In the case of this exemplary embodiment, the two valve flaps 3' are separate parts, although an integral configuration is also possible.

Each valve flaps 3' is provided with a foot part 13, which is essentially L-shaped in cross section. The two foot parts 13 allow the valve flaps 3' to be mounted on the housing 1' by means of a cross bar 8. The two valve flaps 3' can, moreover, be connected to one another in the region of the foot parts.

A bearing part 6', which is open on one side and closed toward the filling opening and where the two valve flaps 3' are fitted by their L-shaped foot parts 13, is in turn provided for the mounting of the valve flaps 3 on the housing 1'. In the gap remaining between the foot parts 13, the cross bar 8 is pushed in through a lateral opening 1b in the housing 1' and extends into a second opening in the housing 1', formed on the second side. The cross bar 8 comprises two laterally connected struts 8a, between which there remains a through-opening, which lends the cross bar 8 a certain flexibility. This type of fastening consequently makes possible the required flexible mobility of the valve flaps 3' in relation to and partly also jointly with the foot parts 13.

Represented in FIG. 9 is the closed position of the check valve and in FIG. 8 the opened position during filling with fuel. Here too it can be seen that the design according to the invention has the effect that the tank can be filled with the fuel largely without turbulence and undesired disturbances occurring.

In the case of this configurational variant, ribs 7 may also be provided for additionally supporting the valve flaps 3'in the closed position.

The third exemplary embodiment of a check valve, represented in FIGS. 10 to 14, has valve flaps 3", which can be produced as molded parts, such as injection molded plastic parts. In the case of this exemplary embodiment as well, the housing 1" is transversely passed through centrally, in the region where the valve seats 4" come together, by a bearing part 6", which is configured such that it is closed toward the filling opening and open on the opposite side. The mounting of the two valve flaps 3" on the housing 1" takes place here in the manner of a hinge, the fixed hinge parts 6"a being formed on the bearing part 6" and the movable hinge parts 3"a, of which there are two in each case and which are opposite said fixed parts, being located on the valve flaps 3". The connection takes place by a pin 9 which can be inserted through the hinge parts 3"a, 6"a. In the case of this embodiment, a swivel mounting of the valve flaps 3" therefore takes place on the housing 1".

Figure 10:
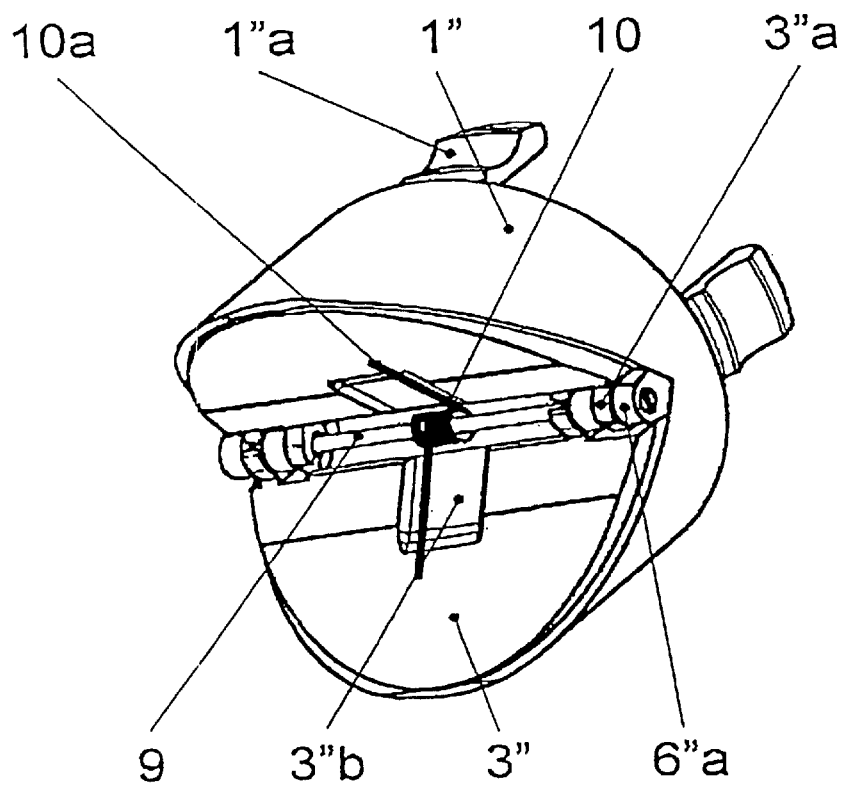
FIG. 10 is an oblique view of the closed valve of a third embodiment.
Figure 11:
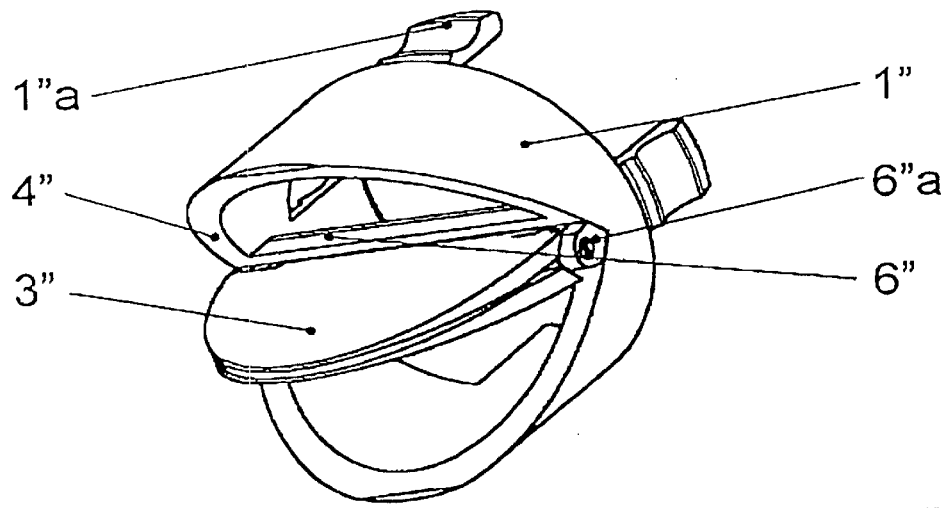
FIG. 11 is an oblique view of the opened valve of FIG. 10.
Figure 12:
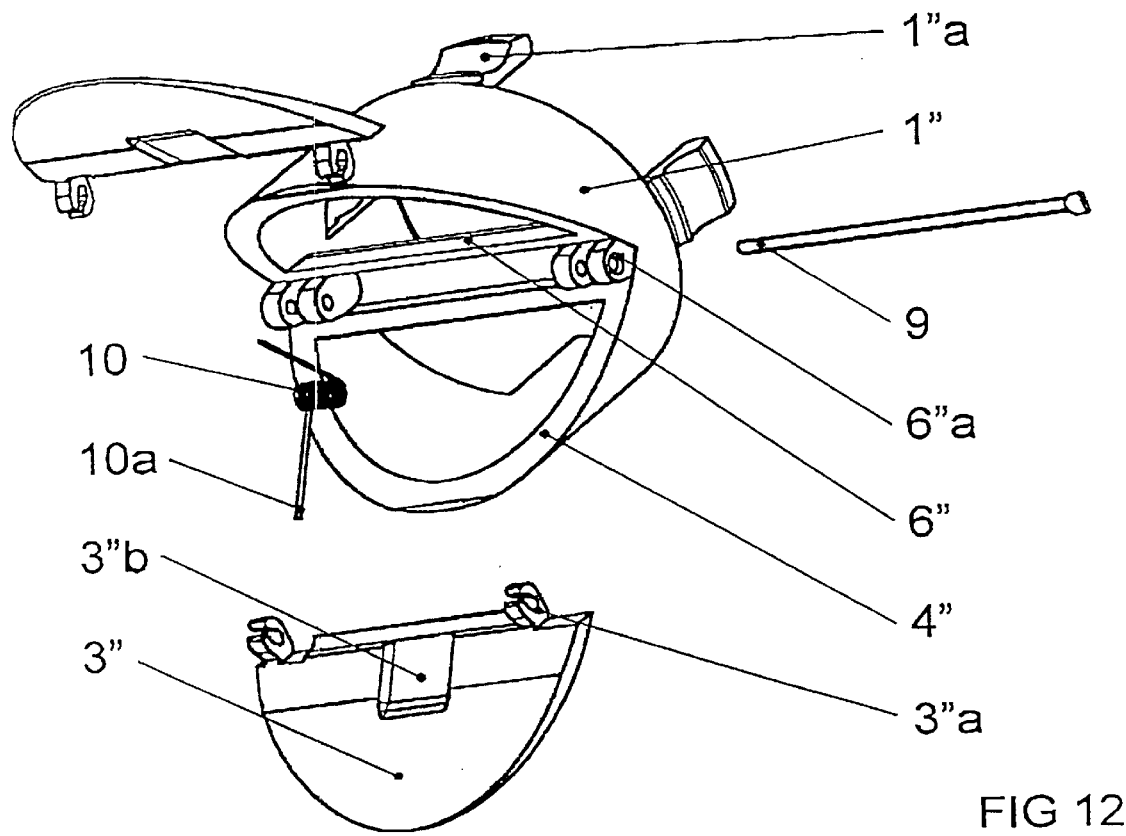
FIG. 12 shows the individual components of the valve of FIG. 10 in an oblique view.

During insertion of the pin 9, a helical spring 10 is fitted onto the pin 9 in the central region, the two legs 10a of said spring being supported in the region of shallow reliefs 3"b formed approximately centrally on the inner sides of the valve flaps 3". The two flaps 3" are pressed by the spring 10 into their closed position, which is represented in FIG. 10. The closing force is therefore determined by the strength of the spring 10. The reliefs 3"b in the valve flaps 3" secure the axial position of the spring 10, it being ensured at the same time that the spring legs 10a rest as far as possible at the centroids of the valve flaps 3", in order to ensure uniform supporting and consequently good closing of the flaps 3".

Figure 13:
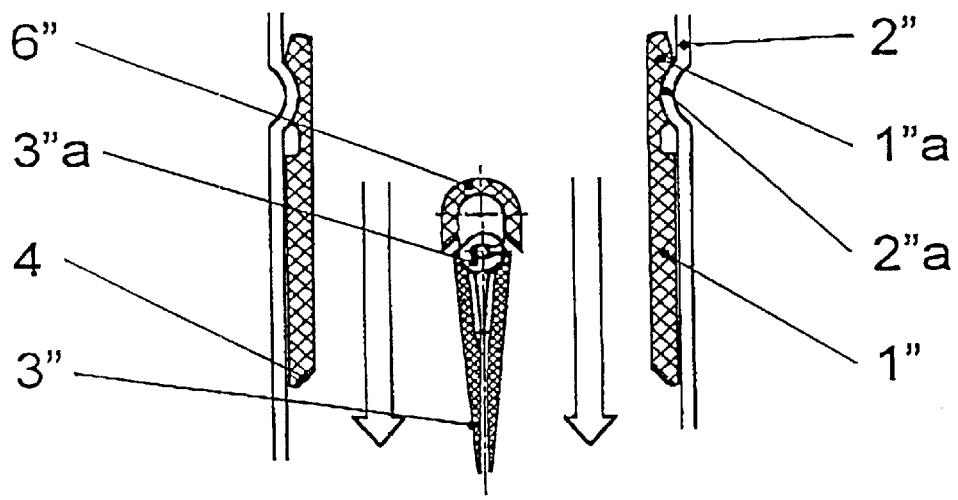
FIG. 13 is a sectional view of the valve of FIG. 10 in the opened position.
Figure 14:
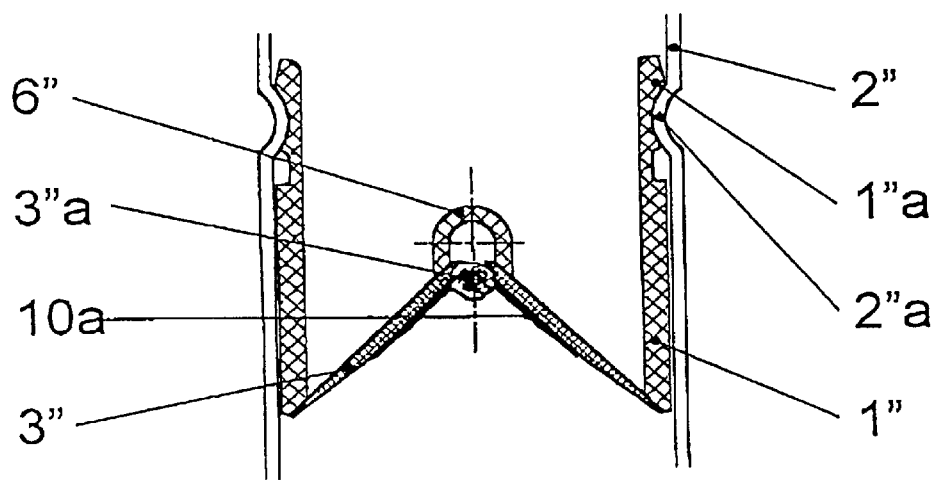
FIG. 14 is a sectional view of the valve of FIG. 10 in the closed position.

As revealed by FIG. 13, it is also the case with this embodiment that the opened valve flaps 3" and the bearing part 6" are of a form that is very favorable in terms of flow dynamics for the fuel flowing in the direction of the arrows.

The V-shaped incision, chosen in the case of all the exemplary embodiments represented, in the housing 1, 1', 1" for forming the valve seats 4, 4', 4" for the valve flaps 3, 3', 3" requires only a comparatively small movement for the valve flaps 3, 3', 3" for opening and closing. If the installation conditions require it, the housing 1, 1', 1" may also be closed off in a planar form, as a result of which the range of movement of the flaps is in each case 90°.

Figure 15:
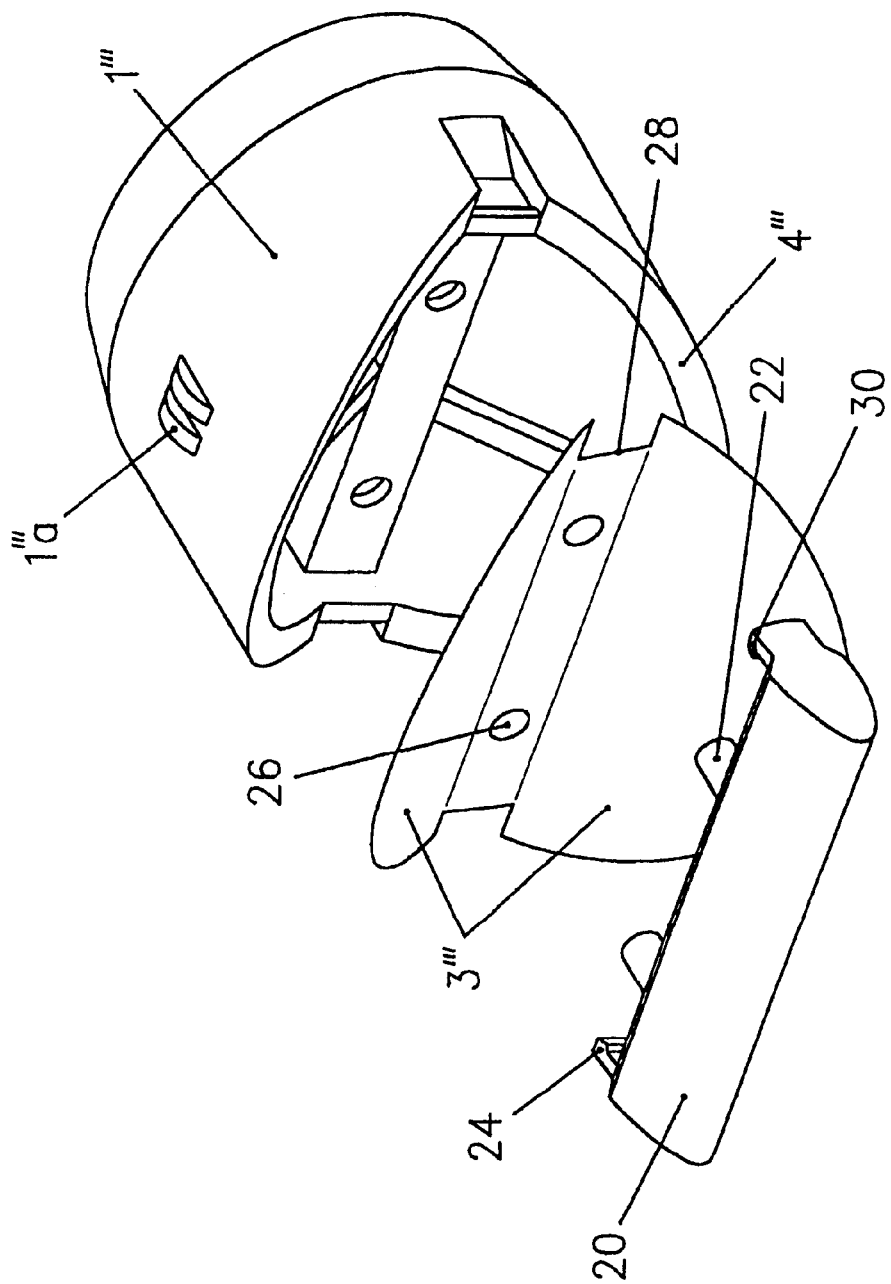
FIG. 15 shows the individual components in oblique view of a fourth embodiment of a valve of the present invention.

A fourth embodiment of the invention is shown in FIG. 15 and is similar to the embodiment of FIGS. 1 through 6. With reference to FIG. 15, a clip 20 for holding valve flaps 3'" in the valve housing includes positioning pins 22 and outside clip elements 24. The valve flaps have a central portion with holes 26 to receive positioning pins 22 and edge cut outs 28 through which clip elements 24 pass. The clip elements 24, which are similar in shape to lugs 5b shown in FIG. 3, secure the valve flaps 3'" in place within housing 1'" by mounting with undercut flanges 30 on the housing 3'". The housing is mounted within the filler pipe in a manner known and described above.

The invention is not restricted to the embodiments represented and described. In particular, it is possible for design measures of one embodiment also to be carried out in the case of other embodiments. It is further possible to provide any form favorable in terms of flow dynamics for that region of the bearing part which is facing the filling opening.

What is claimed is:

1. In a motor-vehicle fuel system having a filler pipe, a check valve located in the filler pipe, said check valve comprising: a housing having a sidewall defining a conduit, said sidewall having an exterior surface and an interior surface, said exterior surface having an element for securing said housing in said filler pipe; a bearing part connecting opposed sides of said interior surface and spanning said conduit and dividing said conduit into substantially equal halves; a moveably mounted flap closure; a securing element for securing said movable mounted flap closure to said bearing element; and a valve seat associated with said sidewall wherein said moveably mounted flap closure comprises two valve flaps projecting from said bearing part which rest on said valve seat for closing off said substantially opposed halves of said conduit wherein said two valve flaps are moved off said valve seat by the inflow of fuel in the filler pipe.

2. The system as claimed in claim 1, wherein said bearing part is essentially closed at a region facing a filling opening for the filler pipe.

3. The system as claimed in claim 2, wherein said bearing part is configured at said essentially closed region with a contour that provides favorable flow dynamics.

4. The system as claimed in claim 1, wherein the valve flaps are formed from a material which allows for movement between an open position and closed position.

5. The system as claimed in claim 1, wherein said valve flaps are component parts of a double flap of an integral configuration.

6. The system as claimed in claim 1, wherein the valve flaps consist of a flexible film material.

7. The system as claimed in claim 6, wherein the valve flaps are mounted on said bearing part by said securing element, which is provided with snap-in elements guided through openings in said flap closure which snap-fit into recesses on said bearing part.

8. The system as claimed in claim 1, wherein said valve flaps consist of spring metal sheet.

9. The system as claimed in claim 8, wherein said valve flaps includes a foot part arranged on the bearing part and said securing element comprises a cross bar mounted in the housing proximate to and spaced from said bearing part for securing said foot part between said cross bar and said bearing part.

10. The system as claimed claim 1, wherein the valve flaps are swivel-mounted on a pin received on said bearing part.

11. The system as claimed in claim 1, wherein the valve flaps are swivel-mounted on said securing element.

12. The system as claimed in claim 10, wherein the valve flaps are plastic molded parts.

13. The system as claimed in claim 12, wherein the valve flaps are biased by at least one spring, which forces them into their closed position.

14. The system as claimed in claim 1, wherein said valve seat for the two valve flaps is formed by a V-shaped incision in the housing, the tip of which points toward the filling opening.

15. The system as claimed in claim 14, wherein said valve flaps form an angle of about 90°.

16. The system as claimed in claim 1, wherein the valve flaps are mounted on said bearing part by said securing element which is provided with clip elements which snap fit into flanges on the housing.

17. The system as claimed in claim 16, wherein said securing element includes guide pins which are received in openings in said flap closure.

18. The system as claimed in claim 16, wherein said flap closure is provided with edge cut outs through which said clip elements project.

19. A check valve, which comprises:
   a housing having a sidewall defining a conduit, said sidewall having an exterior surface and an interior surface;
   a bearing part connecting opposed sides of said interior surface and spanning said conduit and dividing said conduit into substantially equal halves;
   a moveably mounted flap closure;
   a securing element for securing said movable mounted flap closure to said bearing element;
   and a valve seat associated with said sidewall wherein said moveably mounted flap closure comprises two valve flaps projecting from said bearing part which rest on said valve seat for closing off said substantially opposed halves of said conduit wherein said two valve flaps are movable on and off said valve seat.

20. The check valve as claimed in claim 19, wherein said bearing part has an essentially closed region on one surface.

21. The check valve as claimed in claim 20, wherein said essentially closed region is provided with a contour that provides favorable flow dynamics.

22. The check valve as claimed in claim 19, wherein the valve flaps are formed from a material which allows for movement between an open position and closed position.

23. The check valve as claimed in claim 19, wherein said valve flaps are component parts of a double flap of an integral configuration.

24. The check valve as claimed in claim 19, wherein the valve flaps consist of a flexible film material.

25. The check valve as claimed in claim 24, wherein the valve flaps are mounted on said bearing part by said securing element, which is provided with snap-in elements guided through openings in said flap closure which snap-fit into recesses on said bearing part.

26. The check valve as claimed in claim 19, wherein said valve flaps consist of spring metal sheet.

27. The check valve as claimed in claim 26, wherein said valve flaps includes a foot part arranged on the bearing part and said securing element comprises a cross bar mounted in the housing proximate to and spaced from said bearing part for securing said foot part between said cross bar and said bearing part.

28. The check valve as claimed claim 19, wherein the valve flaps are swivel-mounted on a pin received on said bearing part.

29. The check valve as claimed in claim 19, wherein the valve flaps are swivel-mounted on said securing element.

30. The check valve as claimed in claim 28, wherein the valve flaps are plastic molded parts.

31. The check valve as claimed in claim 30, wherein the valve flaps are biased by at least one spring, which forces them into their closed position.

32. The check valve as claimed in claim 19, wherein said valve seat for the two valve flaps is formed by a V-shaped incision in the housing.

33. The check valve as claimed in claim 32, wherein said valve flaps form an angle of about 90°.

34. The check valve as claimed in claim 19, wherein the valve flaps are mounted on said bearing part by said securing element which is provided with clip elements which snap fit into flanges on the housing.

35. The check valve as claimed in claim 34, wherein said securing element includes guide pins which are received in openings in said flap closure.

36. The check valve as claimed in claim 34, wherein said flap closure is provided with edge cut outs through which said clip elements project.

* * * * *